United States Patent
Yu

(10) Patent No.: US 7,025,038 B2
(45) Date of Patent: Apr. 11, 2006

(54) VARIABLE INTAKE MODULE OF ENGINE

(75) Inventor: Chul-Ho Yu, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/975,130

(22) Filed: Oct. 27, 2004

(65) Prior Publication Data

US 2005/0092289 A1 May 5, 2005

(30) Foreign Application Priority Data

Oct. 29, 2003 (KR) .................... 10-2003-0075878

(51) Int. Cl.
  *F02M 61/14* (2006.01)
  *F02B 31/06* (2006.01)
(52) U.S. Cl. ................. 123/306; 123/184.21; 123/456; 123/470
(58) Field of Classification Search ........... 123/184.21, 123/306, 308, 456, 470
See application file for complete search history.

(56) References Cited

U.S. PATENT DOCUMENTS

| | | | |
|---|---|---|---|
| 4,924,834 A * | 5/1990 | Bonfiglioli et al. | 123/470 |
| 5,022,371 A * | 6/1991 | Daly | 123/468 |
| 6,308,686 B1 | 10/2001 | Mammarella et al. | 123/470 |
| 6,412,466 B1 * | 7/2002 | Fredriksson et al. | 123/184.21 |
| 2002/0179043 A1 * | 12/2002 | Lippert | 123/470 |

* cited by examiner

*Primary Examiner*—Tony M. Argenbright
(74) *Attorney, Agent, or Firm*—Morgan Lewis & Bockius LLP

(57) ABSTRACT

A fuel rail in a variable intake module is integrated, thereby obtaining a sufficient coupling area and excellent sealing between the variable intake module and intake manifold. The assembly of injector and variable intake module to an engine is improved. A high pressure fuel path is integrally formed at a lower inner side of the variable intake module, wherein the variable intake module includes a plurality of intake paths and a flap placed at each intake path to form a tumble. Furthermore, an injector insertion part is formed at a lower side of each intake path to communicate with the high pressure fuel path.

2 Claims, 1 Drawing Sheet

VARIABLE INTAKE MODULE OF ENGINE

CROSS-REFERENCE TO RELATED APPLICATIONS

The present application is based on, and claims priority to, Korean Application Serial Number 10-2003-0075878, filed on Oct. 29, 2003, the disclosure of which is hereby incorporated by reference herein in its entirety.

TECHNICAL FIELD OF THE INVENTION

The present invention relates to a variable intake module of an engine.

BACKGROUND OF THE INVENTION

Typically, a variable intake module is placed between an intake manifold and cylinder head of an internal combustion engine. The variable intake module forms a strong tumble within a combustion chamber by adjusting the flow of intake air, thereby resulting in a lean-burn of fuel. A flap is installed inside the variable intake module at a path where the exterior air is taken in. The flap pivots to vary the area and shape of the above path, thereby inducing a strong tumble or swirling of the air/fuel mixture inside the combustion chamber.

Injectors are equipped in the cylinder head for injecting fuel. The injectors are installed at a fuel rail provided with fuel under high pressure. The fuel rail is installed in the cylinder head to maintain the installation disposition of the injector. An injector, fuel rail, and variable intake module are equipped around the intake port of the cylinder head. The injector is equipped to provide fuel and the variable intake module is equipped to form a tumble of the fuel. Typically, the fuel rail installed with the injector is assembled first, and subsequently, the variable intake module is assembled.

However, if pluralities of the above components are located on the intake port side of the cylinder head, the components frequently interfere with each other. Therefore, a portion of the variable intake module should be either reduced in size or removed to prevent interference from occurring. However, the variation of the variable intake module reduces the coupling area between the variable intake module and intake manifold, thereby causing insufficient sealing around the coupling portion therebetween. Furthermore, a narrow space between the injector, fuel rail, and variable intake module deteriorates the assembly.

SUMMARY OF THE INVENTION

An embodiment of the present invention is provided to obtain a sufficient coupling area and an excellent sealing property between a variable intake module and intake manifold. The present invention also improves the assembly of the injector and variable intake module to the engine.

A variable intake module of the engine comprises a high pressure fuel path integrally formed at a lower inner side of a variable intake module. The variable intake module includes a plurality of intake paths and a flap placed at each intake path to form a tumble. An injector insertion part is formed at a lower side of each intake path to communicate with the high pressure fuel path. That is, the conventional fuel rail is integrally formed at the lower side of the variable intake module in the present invention.

BRIEF DESCRIPTION OF THE DRAWINGS

For a better understanding of the nature and objects of the present invention, reference should be made to the following detailed description, read in conjunction with the accompanying drawings, in which.

DETAILED DESCRIPTION OF THE PREFERRED EMBODIMENTS

Figure 1:
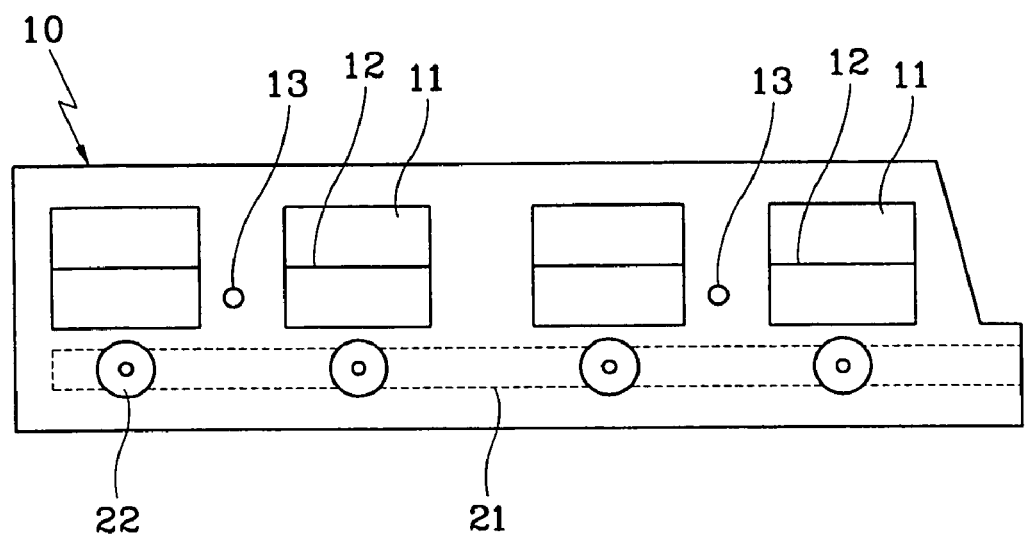
FIG. 1 is a side view of a cylinder head side of a variable intake module according to an embodiment of the present invention.
Figure 2:
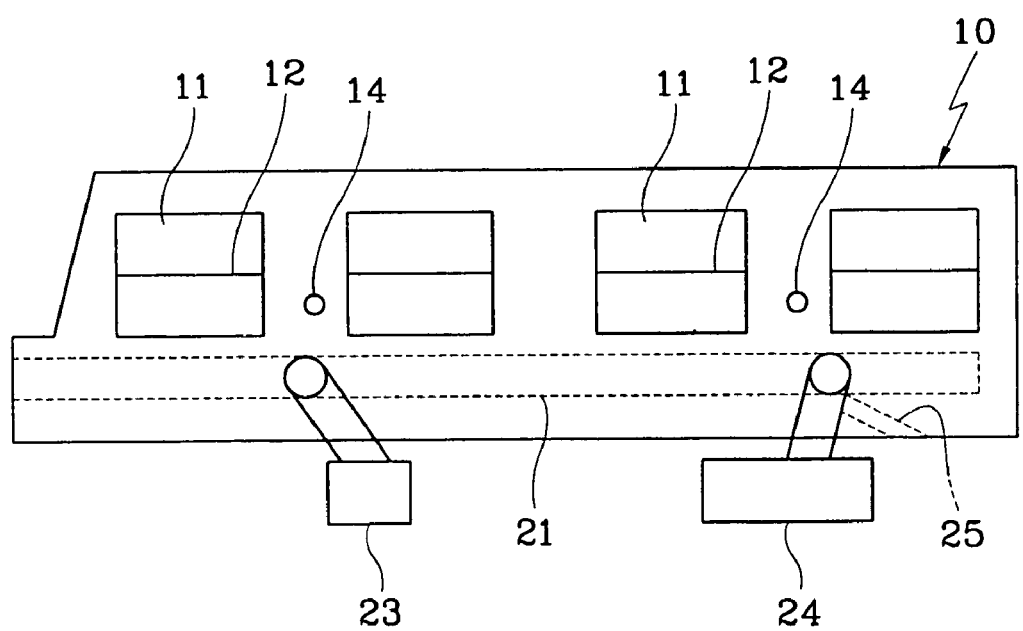
FIG. 2 is a side view of an intake manifold side of a variable intake module according to an embodiment of the present invention.

As illustrated in FIGS. 1 and 2, a variable intake module 10 includes intake paths 11 identical in quantity to that of the cylinders. Each intake path 11 is installed with a flap 12 for adjusting the formation of tumble. A high pressure fuel path 21 is installed at a lower portion of the variable intake module. An injector insertion part 22 is formed at a lower side of each intake paths to communicate with the high pressure fuel path.

One side of the high pressure fuel path 21 is opened for a fuel provision. The other side of the high pressure fuel path 21 is isolated by the main body of the variable intake module. A fuel pressure sensor 23 is configured to communicate with the high pressure fuel path 21 for measuring the pressure inside the high pressure fuel path 21. A high pressure regulator 24 is configured to connect with the high pressure fuel path 21 for properly regulating the pressure inside the high pressure fuel path 21.

A return path 25 is formed in the main body of the variable intake module for discharging excessive fuel by using the high pressure regulator 24.

The Engine Control Unit (ECU) monitors the fuel pressure via the fuel pressure sensor 23. The ECU simultaneously adjusts the pressure inside the high pressure fuel path 21 to a desired level by a feed back control of the high pressure regulator 24. In an embodiment of the invention, the ECU may comprise a processor and memory, as well as associated hardware and software as may be selected and programmed by a person of ordinary skill in the art base on the teachings contained herein.

The variable intake module 10 is positioned between the cylinder head and intake manifold, as previously mentioned, and is assembled by a bolt. A dowel pin is used to accurately fix the variable intake module 10 in relation to the cylinder head and intake manifold before coupling with the bolt. The variable intake module 10 is formed at both planar sides with a cylinder head side dowel pin 13 and an intake manifold side dowel pin 14. The cylinder head side dowel pin 13 is inserted into the pin hole provided at the cylinder head. The intake manifold side dowel pin 14 is inserted into the pin hole formed at the intake manifold.

In order to install the variable intake module 10 to the engine, each injector is firstly and precisely positioned in the injector hole of the cylinder head. The variable intake module is precisely positioned at the cylinder head by using the cylinder head side dowel pin 13. The upper portion of the injector (inserted with an O-ring) is designed to be inserted into the injector insertion part 22. A bolt is used to fix the variable intake module to the cylinder head.

Next, the intake manifold is located in relation to the variable intake module 10 by using the intake manifold side dowel pin 14. The intake manifold is also installed to the variable intake module by a bolt. Accordingly, no interference between the variable intake module 10 and the injector occurs during the engine assembly, resulting in obtaining a sufficient coupling area between the variable module 10 and the cylinder head. In short, excellent sealing is obtained between the variable intake module 10 and cylinder head. Furthermore, since the integrated variable intake module 10 is installed at the engine, a conventional separate fuel rail is not required to be installed in the narrow space between the injector, fuel rail, and variable intake module, thereby improving the assembly thereof.

As apparent from the foregoing, there is an advantage in the present invention in that excellent sealing properties are acquired by obtaining a sufficient coupling area between the variable intake module and intake manifold. There is another advantage in that the assembly of the injector and the variable intake module to the engine is greatly improved.

What is claimed is:

1. A variable intake module of an engine, the module comprising:
   a high pressure fuel path integrally formed at a lower inner side of a variable intake module, wherein said variable intake module includes a plurality of intake paths and a flap placed at each said intake path to form a tumbling of air and fuel within a combustion chamber; and
   an injector insertion part formed at a lower side of each said intake path to communicate with said high pressure fuel path;
   wherein said variable intake module of the engine further comprises:
   a fuel pressure sensor connected with said high pressure fuel path to measure the pressure inside said high pressure fuel path; and
   a high pressure regulator connected with said high pressure fuel path to adjust the pressure inside said high pressure fuel path to a feasible level
   wherein said variable intake module is integrally formed with a return path for allowing said high pressure regulator to discharge excessive fuel.

2. A variable intake module, comprising:
   a variable intake module defining, at a lower inner side thereof, a high pressure fuel path, and wherein said variable intake module further defines a plurality of intake paths;
   at least one flap positioned with respect to each said intake path wherein said at least one flap is configured and dimensioned to generate a tumble of fuel mixture within a cylinder; and
   an injector insertion component positioned at a lower side of each said intake path, said injector insertion component being configured and dimensioned to communicate with said high pressure fuel path;
   further comprising:
   a fuel pressure sensor in communication with said high pressure fuel path to measure pressure inside said high pressure fuel path; and
   a high pressure regulator coupled with said high pressure fuel path to adjust pressure inside said high pressure fuel path,
   wherein said variable intake module further defines a return path into which said high pressure regulator can discharge excessive fuel.

* * * * *